US012264950B2

(12) United States Patent
Ding et al.

(10) Patent No.: US 12,264,950 B2
(45) Date of Patent: Apr. 1, 2025

(54) METHOD AND APPARATUS FOR MASS FLOW VERIFICATION

(71) Applicant: MKS Instruments, Inc., Andover, MA (US)

(72) Inventors: Junhua Ding, Boxborough, MA (US); Michael L'Bassi, Sterling, MA (US)

(73) Assignee: MKS Instruments, Inc., Andover, MA (US)

( * ) Notice: Subject to any disclaimer, the term of this patent is extended or adjusted under 35 U.S.C. 154(b) by 76 days.

(21) Appl. No.: 17/656,177

(22) Filed: Mar. 23, 2022

(65) Prior Publication Data

US 2023/0304837 A1 Sep. 28, 2023

(51) Int. Cl.
*G01F 1/42* (2006.01)
*G01F 1/86* (2006.01)
*G05D 7/06* (2006.01)

(52) U.S. Cl.
CPC .................. *G01F 1/42* (2013.01); *G01F 1/86* (2013.01); *G05D 7/0629* (2013.01)

(58) Field of Classification Search
CPC ............ G01F 1/42; G01F 1/86; G05D 7/0629
USPC ....................................................... 73/861.61
See application file for complete search history.

(56) References Cited

U.S. PATENT DOCUMENTS

| 6,995,072 B2 | 2/2006 | Walker et al. |
| 7,136,767 B2 | 11/2006 | Shajii et al. |
| 7,174,263 B2 | 2/2007 | Shajii et al. |
| 7,463,991 B2 | 12/2008 | Shajii et al. |
| 7,474,968 B2 | 1/2009 | Ding et al. |
| 7,743,670 B2* | 6/2010 | Lee .......................... G01F 25/17 73/861.08 |
| 7,757,554 B2 | 7/2010 | Ding et al. |
| 2006/0283254 A1* | 12/2006 | Ding ....................... G01F 25/15 73/700 |

(Continued)

FOREIGN PATENT DOCUMENTS

| JP | 2010-092104 A | 4/2010 |
| KR | 10-0458511 B1 | 12/2004 |
| KR | 10-1073257 B1 | 10/2011 |

OTHER PUBLICATIONS

International Search Report and Written Opinion received for PCT Patent Application No. PCT/US2023/063209, mailed on Jun. 9, 2023, 10 pages.

*Primary Examiner* — Alexander A Mercado
*Assistant Examiner* — Rodney T Frank
(74) *Attorney, Agent, or Firm* — Hamilton, Brook, Smith & Reynolds, P.C.

(57) ABSTRACT

Devices and methods for mass flow verification are provided. A mass flow verifier includes a chamber configured to receive a fluid, a critical flow nozzle upstream of the chamber, a chamber valve, a downstream valve, and a bypass valve. The chamber valve is configured to selectively enable fluid flow from the critical flow nozzle to the chamber. The downstream valve is configured to selectively enable fluid flow from the chamber to a downstream location. The bypass valve is configured to selectively enable fluid flow from the critical flow nozzle to a dump location. The mass flow verifier further includes a controller configured to verify flow rate of the fluid based on a rate of rise in pressure of the fluid as detected by a pressure sensor in the chamber.

24 Claims, 8 Drawing Sheets

(56) References Cited

U.S. PATENT DOCUMENTS

2009/0112504 A1    4/2009   Ding et al.
2014/0083514 A1    3/2014   Ding

* cited by examiner

METHOD AND APPARATUS FOR MASS FLOW VERIFICATION

BACKGROUND

High-precision fluid delivery and measurement systems such as mass flow controllers (MFCs), mass flow ratio controllers (FRCs), and mass flow meters (MFMs) are useful in applications such as semiconductor wafer fabrication and other types of materials processing. In many instances, the accuracy of these fluid delivery systems needs to be verified.

Mass flow verifiers (MFVs) may be used to verify the accuracy of an MFC, FRC, MFM, or other device-under-test (DUT). One type of a mass flow verifier is a rate-of-rise (ROR) flow verifier. A typical ROR flow verifier may include a chamber volume, a pressure sensor, a temperature sensor, and two isolation valves, one upstream and one downstream. The valves may be closed during idle, and may open when a run is initiated, allowing flow of fluid from the MFC (or MFM) through the flow verifier. Once fluid flow has stabilized, the downstream valve may be closed, and as a result the pressure may begin to rise in the volume. The pressure transducer may measure the pressure rise. This measurement may be used to calculate the inlet flow rate to the MFV, thereby verifying the flow accuracy performance of the DUT.

It is desirable to reduce the operation time of performing a mass flow verification process.

SUMMARY

Improved mass flow verification devices and methods are provided. The described devices and methods can provide for external volume insensitivity while enabling rapid verification of mass flow rate using ROR methods. The described devices and methods can also provide for gas-independent measurements.

A mass flow verifier includes a chamber configured to receive a fluid, a critical flow nozzle upstream of the chamber, a chamber valve, a downstream valve, and a bypass valve. The chamber valve is configured to selectively enable fluid flow from the critical flow nozzle to the chamber. The downstream valve is configured to selectively enable fluid flow from the chamber to a downstream location. The bypass valve is configured to selectively enable fluid flow from the critical flow nozzle to a dump location. The mass flow verifier further includes a controller configured to verify flow rate of the fluid based on a rate of rise in pressure of the fluid as detected by a pressure sensor in the chamber.

The controller can be further configured to select closure of the downstream valve at a first timepoint to generate a rise in pressure in the chamber and to select closure of the chamber valve and opening of the bypass valve at a second timepoint to allow pressure within the chamber to stabilize and divert fluid flow to the dump location, such as a location downstream of the downstream valve.

A method of verifying a mass flow rate includes closing a downstream valve at a first timepoint to generate a rise in pressure in a chamber configured to receive a fluid. The downstream valve is configured to selectively enable fluid flow from the chamber to a downstream location. The method further includes closing a chamber valve and opening a bypass valve at a second timepoint to allow pressure within the chamber to stabilize and divert fluid flow to a dump location. The chamber valve is configured to selectively enable fluid flow to the chamber from a critical flow nozzle upstream of the chamber, and the bypass valve is configured to selectively enable fluid flow from the critical flow nozzle to the dump location. The method further includes verifying flow rate of the fluid based on a rate of rise in pressure of the fluid as detected by a pressure sensor in the chamber.

Verification of flow rate can be based on a two-point flow verification calculation. For example, the two-point flow verification calculation is according to the following, where Q is the flow rate, k is a constant, $V_c$ is a volume of the chamber, T is a temperature of the fluid in the chamber, $T_{stp}$ is standard temperature, $P_{stp}$ is standard pressure, $P_2$ is a pressure as detected at the first timepoint, $P_4$ is pressure as detected after the second timepoint, $t_2$ is time of the first timepoint, and $t_3$ is time of the second timepoint:

$$Q = k \cdot \frac{V_c \cdot T_{stp}}{P_{stp} \cdot T} \cdot \left( \frac{P_4 - P_2}{t_3 - t_2} \right)$$

The temperature T can be a temperature as measured after the second timepoint. The critical flow nozzle is configured to maintain the fluid flowing through the critical flow nozzle at a critical flow.

Flow rate can be verified based on at least two consecutive rate of rise iterations to obtain an averaged flow rate. Optionally, subsequent flow rates can be determined based on a dynamic flow verification calculation. For example, the dynamic flow verification calculation is according to the following, where Q is the flow rate, k is a constant, $V_c$ is a volume of the chamber, $T_{stp}$ is standard temperature, $P_{stp}$ is standard pressure, P is a detected pressure in the chamber, and T is a temperature of the fluid in the chamber:

$$Q = k \cdot \frac{V_c \cdot T_{stp}}{P_{stp}} \cdot \frac{d}{dt}\left(\frac{P}{T}\right)$$

The flow rate obtained from a dynamic flow verification calculation (Q) can be further verified based on a flow rate determined from a prior two-point flow verification calculation. In addition, or alternatively, a temperature T used in a dynamic flow verification calculation can be estimated, at least in part, based on a flow rate and/or temperature obtained from a prior two-point flow verification calculation.

Prior to a rate of rise measurement iteration, the chamber valve and the downstream valve can be opened, and the bypass valve closed, to permit line pressure between the chamber and a device under test to stabilize. Subsequent to a rate of rise measurement iteration, the chamber valve and the downstream valve can be opened, and the bypass valve closed, to permit pressure inside the chamber to decrease. The closing of the downstream valve and subsequent closing of the chamber valve and opening of the bypass valve for a rate of rise measurement iteration can be repeatedly performed for a multiple-cycle flow verification.

A method of using a mass flow verifier can include opening the chamber valve and downstream valve and closing the bypass valve to permit line pressure between the chamber and a device under test to stabilize. A first pressure of fluid in the chamber can be detected, and the downstream valve can be closed to generate a rate of rise in pressure in the chamber. The method can further include closing the chamber valve and opening the bypass valve to allow pressure within the chamber to stabilize and divert fluid flow a dump location. A second pressure of fluid in the chamber can be detected, and a flow rate of the fluid based on the detected first and second pressures can be determined. The method can further include opening the chamber valve and downstream valve and closing the bypass valve to permit pressure inside the chamber to decrease subsequent to detection of the second pressure. The described method, or portions thereof, can be iteratively performed for a multiple-cycle flow verification.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
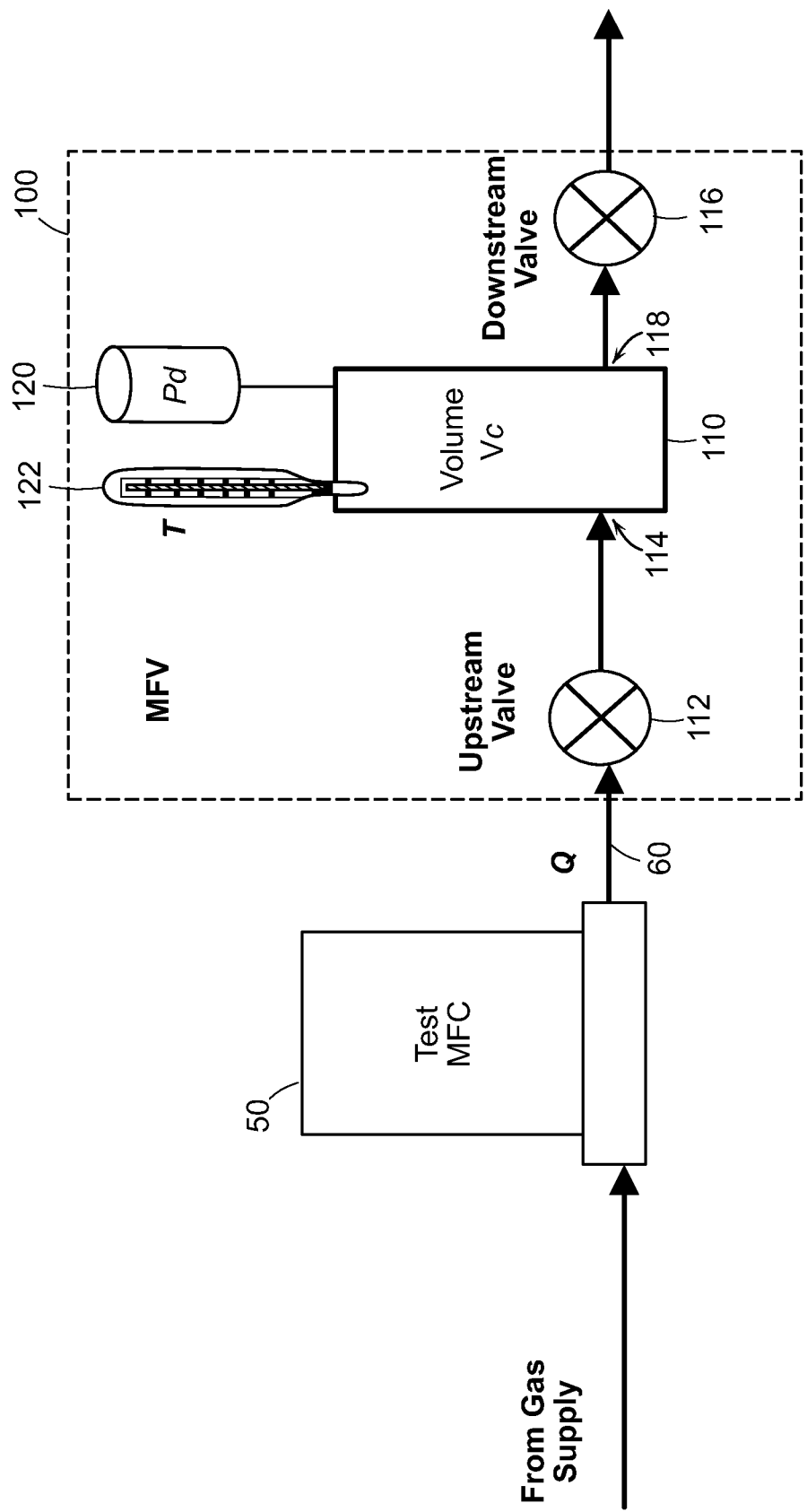
FIG. 1 is a schematic of a prior art mass flow verifier (MFV).

The accuracy of a flow provided by mass flow controller (MFC) or other device-under-test (DUT) can be verified by a mass flow verifier (MFV). MFVs can utilize rate-of-rise (ROR) methods to determine a flow rate of a fluid entering the device from a DUT. An example prior-art MFV utilizing an ROR method of measurement is shown in FIG. 1. As illustrated, the MFV 100 includes a chamber 110 defining a volume ($V_c$) to hold an incoming fluid (e.g., gas) from a DUT 50. The MFV further includes an upstream isolation valve 112 at a volume inlet 114, a downstream valve 116 at a volume outlet 118, a pressure sensor 120, and a temperature sensor 122. The pressure sensor is configured to measure a gas pressure inside the chamber 110, and the temperature senor is configured to measure a gas temperature inside the chamber 110.

ROR verification methods are based on the law of conservation of mass and the ideal gas law. A flow rate can be determined by the following equation, where P is gas pressure within a volume, T is gas temperature, k is a conversion factor, $T_{stp}$ is the standard temperature (273.15 K), and $P_{stp}$ is the standard pressure (1.01325e5 Pa):

$$Q = k \cdot \frac{V_c \cdot T_{stp}}{P_{stp}} \cdot \frac{d}{dt}\left(\frac{P}{T}\right) \tag{1}$$

Figure 2:
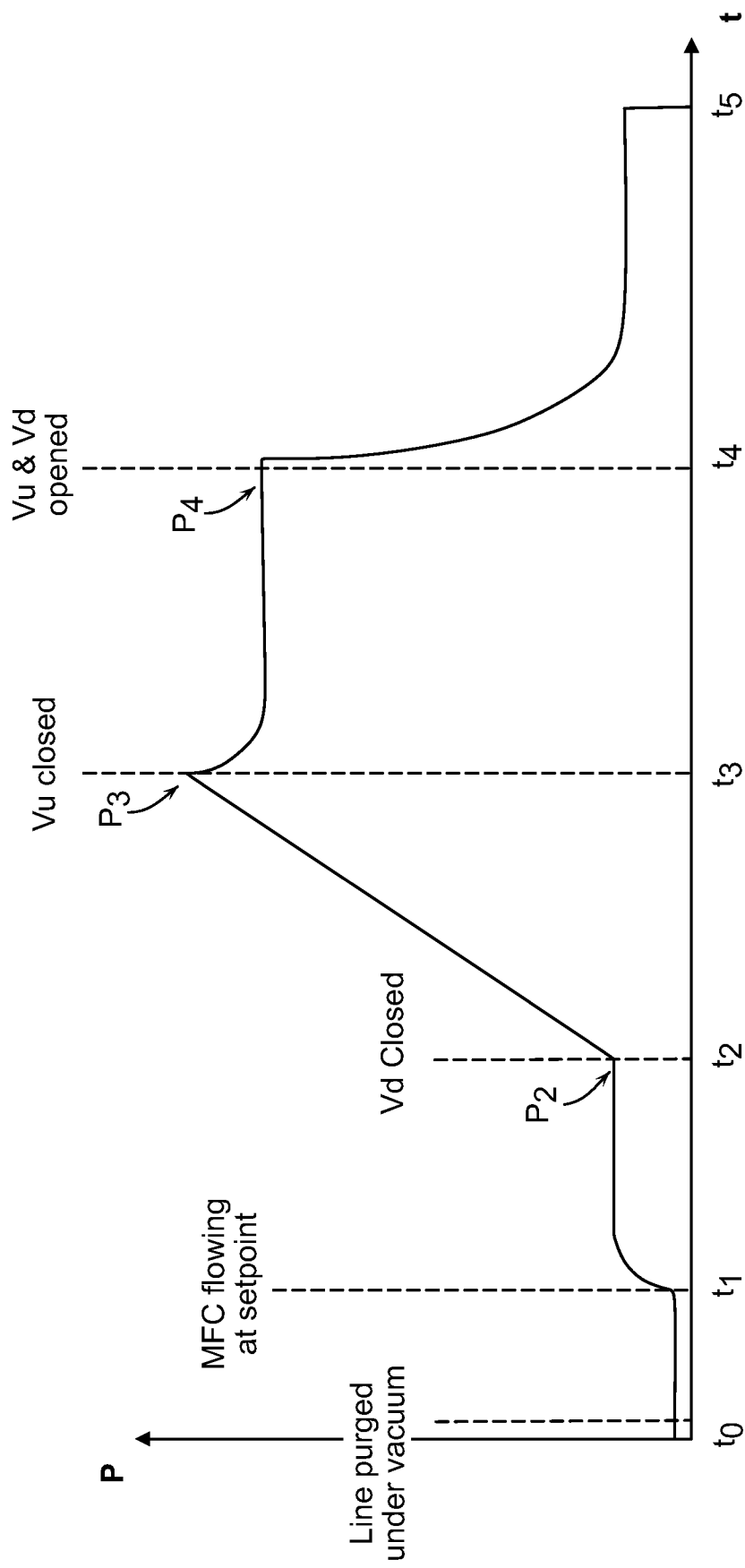
FIG. 2 is a graph of pressure versus time, illustrating operation of the MFV of FIG. 1.

With the example prior-art MFV of FIG. 1, a two-point flow verification calculation can be performed to determine a flow rate by operation of the MFV as illustrated in FIG. 2. As used herein, a two-point flow verification calculation is one in which two pressure measurements are obtained during a ROR test.

Operation of the MFV can include, with valves 112 and 116 open, purging of the line 60 under vacuum at time $t_0$ and permitting the MFC to flow at a setpoint at time $t_1$, prior to a flow verification cycle. The flow verification cycle can include closing the downstream valve (Vd, or valve 116 as illustrated in FIG. 1) at time $t_2$, after which point pressure rises within the volume; closing the upstream valve (Vu, or valve 112 as illustrated in FIG. 1) at time $t_3$, upon which pressure and temperature of the gas within the volume can be allowed to stabilize; and, opening both the upstream and downstream valves at time $t_4$, after which point gas may exit the chamber until and return to the flow setpoint by time $t_5$.

The two-point calculation can be as follows, where equation parameters are as indicated above with respect to Eqn. 1 and where measured values for pressure ($P_2$, $P_4$) and time ($t_2$, $t_3$) are indicated with respect to FIG. 2:

$$Q = k \cdot \frac{V_c \cdot T_{stp}}{P_{stp}} \cdot \frac{\Delta P}{\Delta t} = k \cdot \frac{V_c \cdot T_{stp}}{P_{stp} \cdot T} \cdot \left(\frac{P_4 - P_2}{t_3 - t_2}\right) \tag{2}$$

In particular, the MFV collects the inlet gas flow during a period from time $t_2$ to $t_3$, and a change in pressure over that time period is determined. However, $P_4$ is used in Eqn. 2 in place of $P_3$ to provide for a more accurate measurement of pressure change, as can be obtained after the gas temperature has been permitted to stabilize within the environment for a period time during which both the upstream and downstream valves remain closed (i.e., for a period of time between $t_3$ and $t_4$). $P_4$ may be taken after stabilization before or at $t_4$. An advantage of two-point flow verification methods as described above is that a flow rate determination is not dependent on gas-specific parameters. In other words, the flow verification can be performed with an unknown gas or a mixture of gases.

Temperature sensors within an MFV are typically disposed at or on an interior wall of the chamber. Thus, a temperature sensor may be unable to obtain an instantaneous accurate temperature of the gas as a temperature of the wall may affect the measurement. A temperature T used in Eqn. 2 can be one that is obtained at the same time or close to the time that a measured value of $P_4$ is obtained.

With the MFV of FIG. 1, an external volume (i.e., the volume between the DUT 50 and the MFV 100) is typically considered to be part of the total volume when determining mass flow rate according to Eqn. 2. A mass flow rate determined without consideration of the external volume can be inaccurate. The external volume can be included in the value provided for $V_C$, in addition to a volume of the chamber 110, and/or the MFV can be calibrated to account for the external volume. Particularly as an external volume becomes large, an obtained flow measurement can be of decreased accuracy as the pressure sensor 120 measures pressures rising inside the chamber 110 and may not capture, or may inaccurately capture, pressure as rising in the external volume. Thus, while MFVs such as those shown in FIG. 1 can advantageously provide for gas-agnostic readings, inaccuracies can arise due to external volume effects and a relatively long period of time can be required to perform a flow verification cycle.

Figure 3:
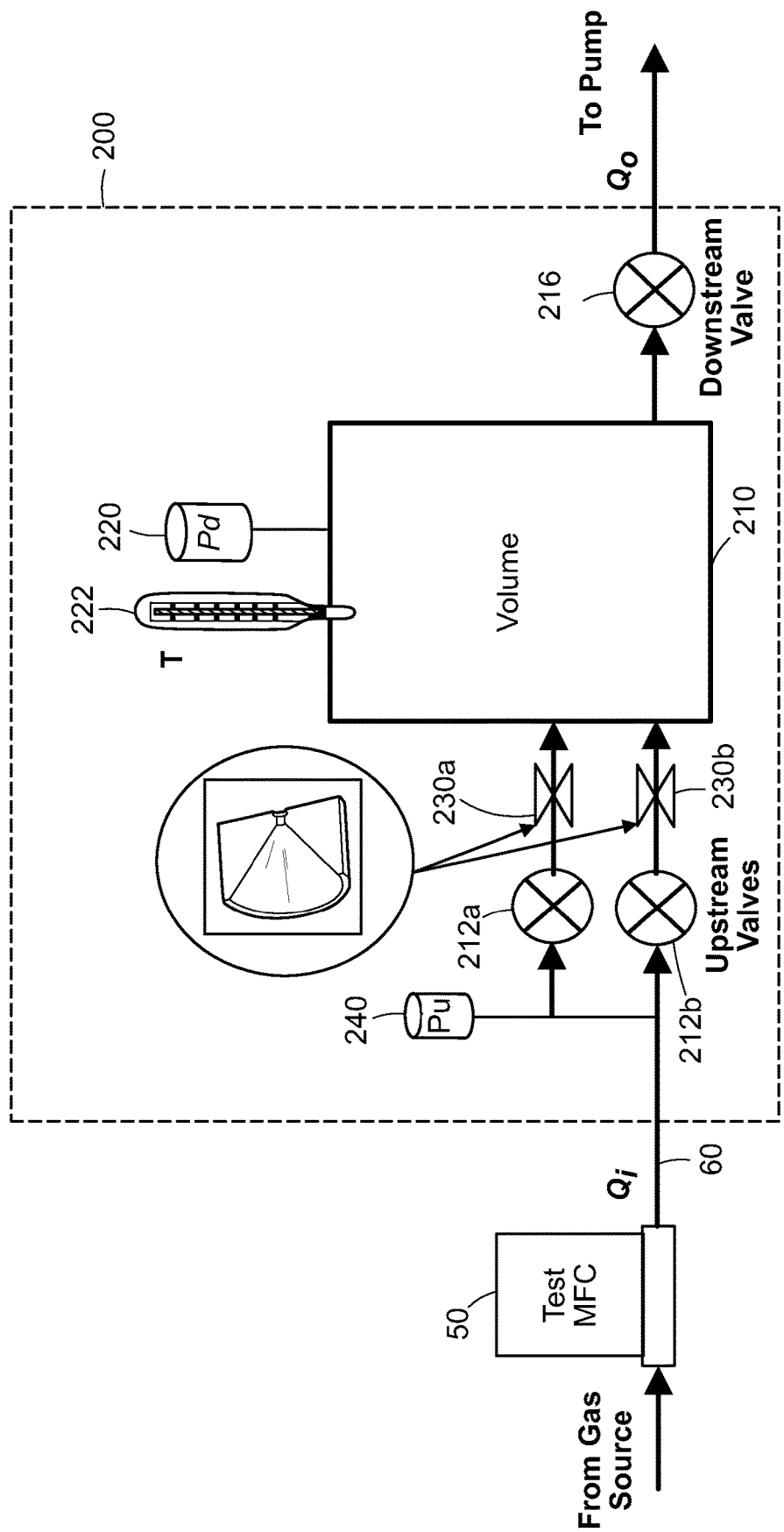
FIG. 3 is a schematic of another prior art MFV.

Another example of a prior-art MFV is shown in FIG. 3, which can provide for external volume insensitivity. In addition to a chamber 210 defining a volume, a pressure sensor 220, and a temperature sensor 222, the MFV 200 includes at least one nozzle 230a, 230b disposed between an upstream valve 212a, 212b and the chamber 210. The nozzle can be a critical flow nozzle, alternatively referred to as a sonic nozzle, that creates a pressure drop and sonic flow conditions. With sonic flow, variations in pressure downstream of the nozzle have no effect on upstream conditions. Thus, the sonic nozzle can effectively decouple the MFV from an external, upstream volume to provide for a more accurate flow measurement.

As illustrated in the example configuration shown in FIG. 3, multiple nozzles 230a, 230b can be included, each of which may provide a restriction of a differing dimension to extend an operable range of the MFV. An upstream pressure sensor 240 can be included to confirm sonic flow conditions (e.g., the pressure upstream of the nozzle is 2× greater than pressure downstream of the nozzle).

The MFV 200 is an external volume insensitive (EVI) mass flow verifier, an example of which is the High Accuracy MFV (HA-MFV, MKS Instruments, Andover, MA). The HA-MFV can be installed on a process tool to verify a flow rate of an MFC in situ. The insensitivity of the HA-MFV to an external volume can result in more precise matching of measurements between HA-MFVs on multiple tools applied to a same process.

Figure 4:
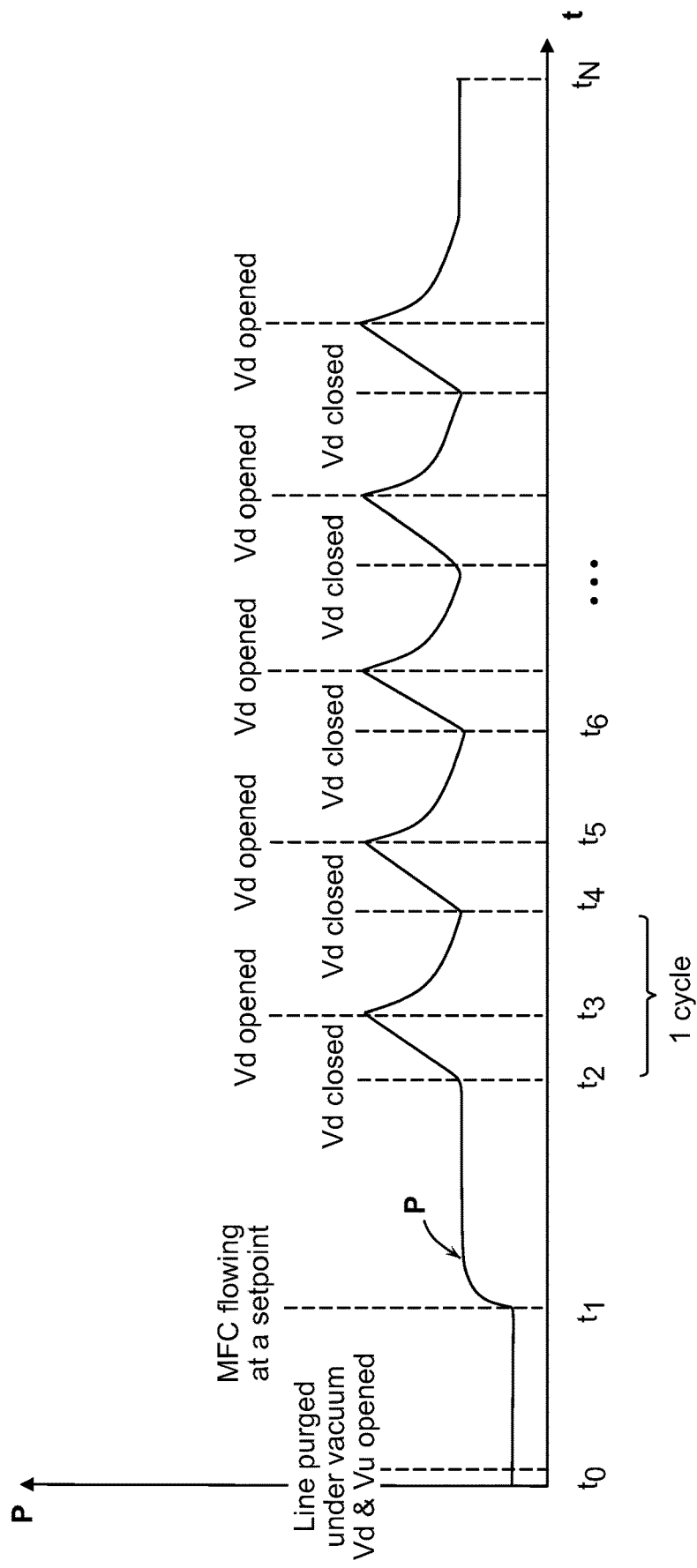
FIG. 4 is a graph of pressure versus time, illustrating operation of the MFV of FIG. 3.

Example operation of the MFV 200 is shown in FIG. 4 and includes, with upstream valves 212 and downstream valve 216 open, purging of the line under vacuum at time t0 and permitting the MFC to flow at a setpoint at time $t_1$ prior to a flow verification cycle. A flow verification cycle includes closing of the downstream valve (Vd, or valve 216 as illustrated in FIG. 3) at time $t_2$, after which point pressure rises within the volume until time $t_3$. At time $t_3$ the downstream valve is opened and the process repeats for one or more additional cycles. Typically, the temperature sensor 222 is disposed on a wall of the chamber volume of the MFV. A dynamic ROR flow verification can be performed according to Eqn. 1 in which a gas temperature T is estimated from a measured wall temperature ($T_w$) provided by the temperature sensor 222. The gas temperature T can be estimated based on a gas temperature model that is a function of any or all of gas molecular weight (M), gas specific heat ratio (γ), gas heat capacity (Cp), gas thermal conductivity (k), volume of the chamber (Vc), and internal/wet surface area of the volume of the chamber (As):

$$T = f_T(M, \gamma, Cp, k, Q, T_w, Vc, As) \quad (3)$$

Figure 5:
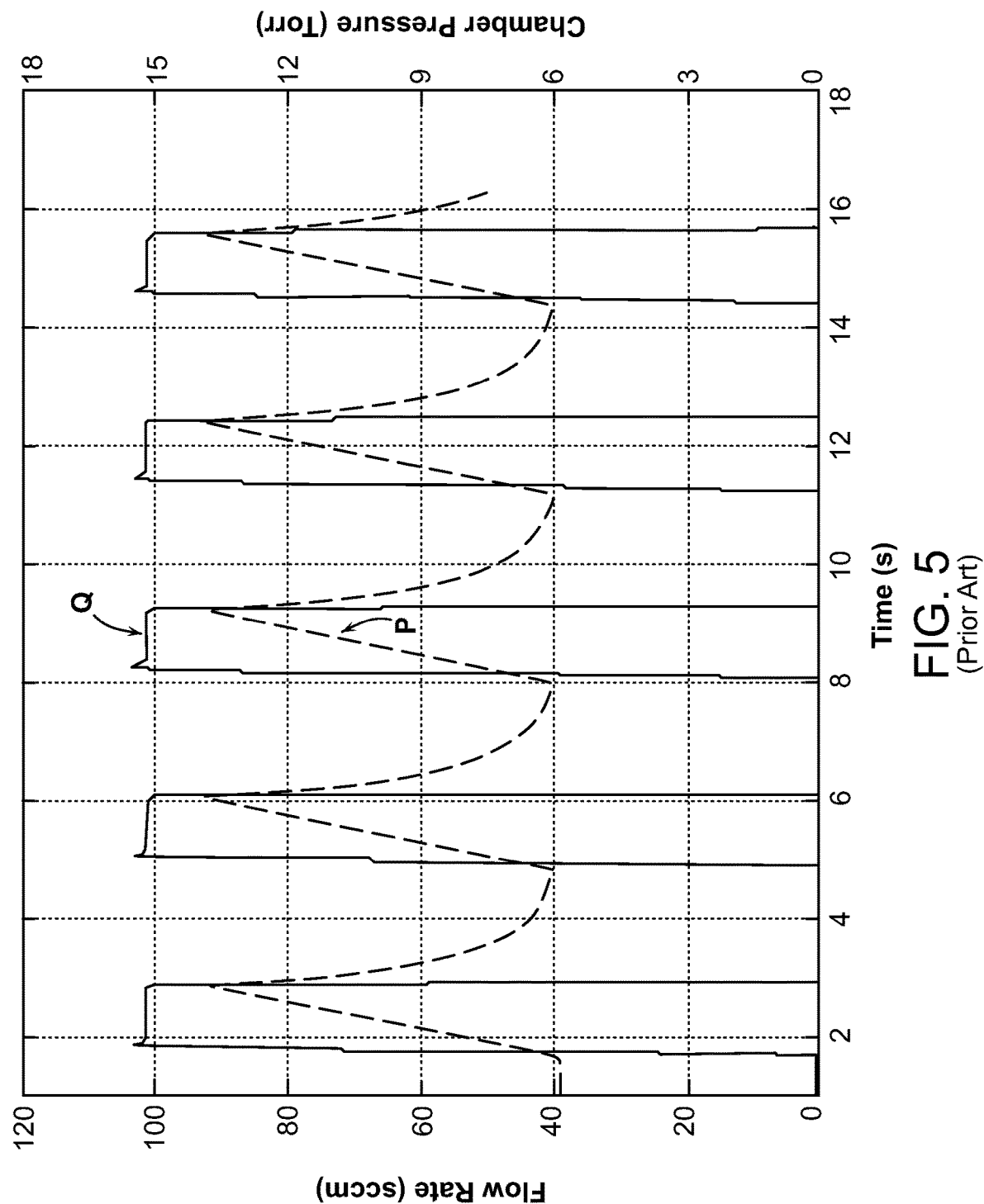
FIG. 5 is a graph illustrating flow rate and pressure over time during an example operation of the MFV of FIG. 3.

Equations 1 and 3 can be solved recursively to obtain a verified flow rate (Q) in the MFV 200. An output flow verification value can be an average of multiple short period runs, as illustrated in FIG. 5. A two-point flow verification calculation, such as that shown in Eqn. 2, can generally not be used in conjunction with an HAMFV, as shown in FIG. 4. As noted above, one of the two pressure measurements used in the calculation is obtained at some point in time after an upstream valve is closed and pressure and temperature of the gas within the chamber have been allowed to stabilize (e.g., after gas flow into the chamber has been stopped). To obtain a pressure and/or temperature measurement before the gas has stabilized can result in inaccurate measurement (s) and, consequently, an inaccurate calculated flow rate. To provide for stabilization in a chamber of an HAMFV, flow to the chamber can be halted; however, the closing of an upstream valve in the HAMFV can disrupt flow through the critical flow nozzle. With a disruption of sonic flow conditions, external volume insensitivity can be lost and, furthermore, upon re-opening of the upstream valve, additional time can then be required to allow for critical flow conditions to be reestablished.

To provide for rapid verification without interruption of sonic flow conditions, an HAMFV, such as MFV 200, performs dynamic flow verification in which ROR measurements are obtained over short periods of time and a temperature estimation model is used to more accurately determine a temperature of the gas without requiring a stabilization time. Accuracy of the gas temperature estimation (T) used in dynamic flow calculations can be highly dependent on gas properties and on the temperature estimation model. For example, for non-ideal gases and gas mixtures, known gas properties may not be accurate or available.

Temperature estimation models are generally derived from first principle laws, such as the ideal gas law. An example of a linearized temperature estimate model is provided as follows, where k0, k1, ... k8 are constants and a remainder of the variables are as defined above with respect to Eqn. 3:

$$T = k0 + k1*M + k2*\gamma + k3*Cp + k4*k + k5*Q + k6*T_w + k7*Vc + k8*As \quad (4)$$

Figure 6:
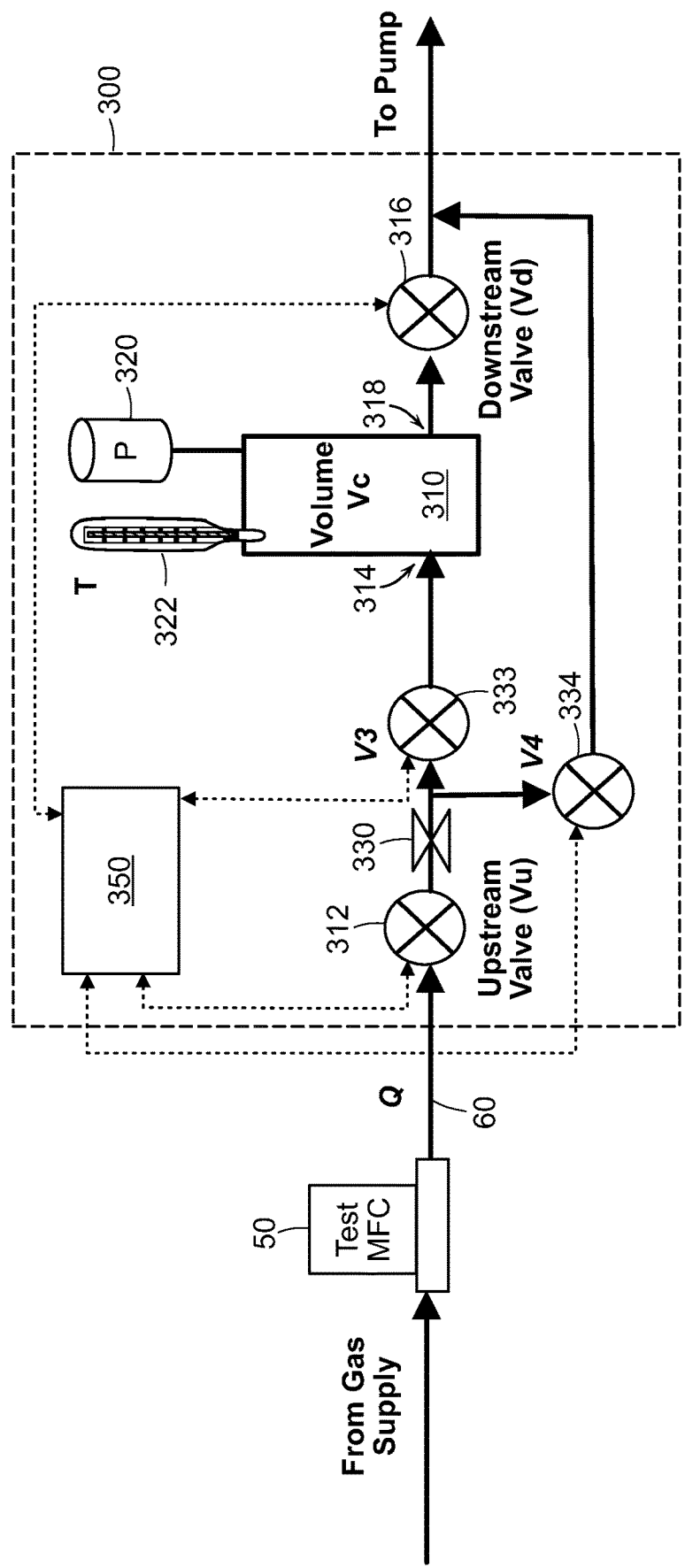
FIG. 6 is a schematic of an example MFV.

An MFV that can provide for external volume insensitivity and that can overcome difficulties relating to the MFVs described with respect to FIGS. 1 and 3 is provided. As illustrated in FIG. 6, an MFV 300 includes a chamber 310, a nozzle 330 upstream of the chamber, a downstream valve 316 disposed at a chamber outlet 318, a chamber valve 333 disposed at a chamber inlet 314, and a bypass valve 334. The nozzle 330 can be a critical flow nozzle, orifice or other flow restrictor capable of providing critical flow conditions. The chamber valve 333 is configured to selectively enable fluid flow from the critical flow nozzle to the chamber. The bypass valve is configured to selectively enable fluid flow from the critical flow nozzle to a dump location, for example, a location downstream of the downstream valve 316 or directly to a pump. An upstream valve 312 can be included to isolate the device when not in use.

The MFV 300 can further include a controller 350 that receives temperature and pressure measurements from, respectively, the temperature sensor 322 and pressure sensor 320 of the device to verify a flow rate of a fluid based on a rate of rise in pressure of the fluid in the chamber 310. The controller can be further configured to select closure of the downstream valve 316 at a first timepoint (e.g., time $t_2$ in FIG. 7) to generate a rise in pressure in the chamber and to select closure of the chamber valve 333 and opening of the bypass valve 334 at a second timepoint (e.g., time $t_3$ in FIG. 7) to allow pressure within the chamber to stabilize and divert fluid flow to the dump location.

By including valve switching downstream of a critical flow nozzle and bypassing fluid flow to a dump location during a rate of rise operation, a two-point flow verification process can be used with an MFV configuration that is insensitive to external volume. Such an MFV can provide for improved flow verification accuracy over prior art MFV methods, particularly for unknown gases or gas mixtures and in situations in with high external volumes exist. A chamber valve allows for two-point verification, and with the addition of a bypass valve, a stable pressure can be maintained in the external volume upstream of the nozzle and critical flow can be maintained through the nozzle. The MFV can also provide for improved speed of subsequent flow verification processes, as described further below.

Figure 8:
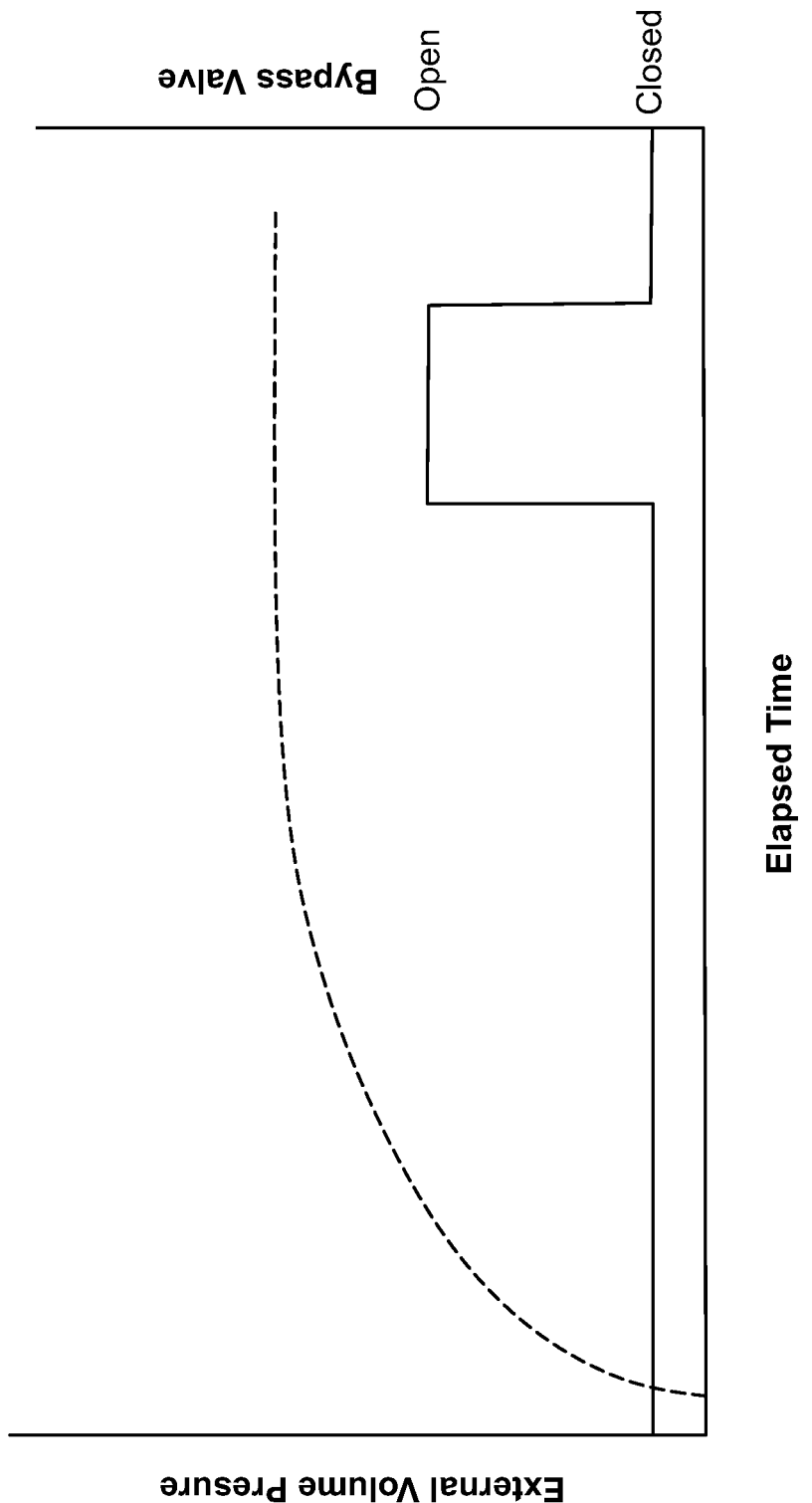
FIG. 8 is a graph of external volume pressure over time in conjunction with operation of a bypass valve for the MFV of FIG. 6.

An example pressure profile upstream of the nozzle of the MFV 300 is shown in FIG. 8. Under example low flow conditions and with a high external volume, it can take as long as two minutes to stabilize pressure through the nozzle. Without the switching of flow downstream of the nozzle during a two-point calculation operation, the external volume can be dead-ended, creating a substantial upset to steady state flow. As illustrated in FIG. 8, with a bypass valve downstream of the critical flow nozzle, an external volume upstream of the nozzle can remain in a constant pressure state even as the chamber valve 333 is closed.

The controller 350 can be configured to verify flow rate based on a two-point flow verification calculation, for example, as provided by Eqn. 2, repeated below, where $P_2$ is a pressure as detected at the first timepoint, $P_4$ is pressure as detected after the second timepoint (e.g., at time $t_4$ of FIG. 7), $t_2$ is time of the first timepoint, and $t_3$ is time of the second timepoint:

$$Q = k \cdot \frac{V_c \cdot T_{stp}}{P_{stp} \cdot T} \cdot \left( \frac{P_4 - P_2}{t_3 - t_2} \right) \quad (2)$$

Figure 7:
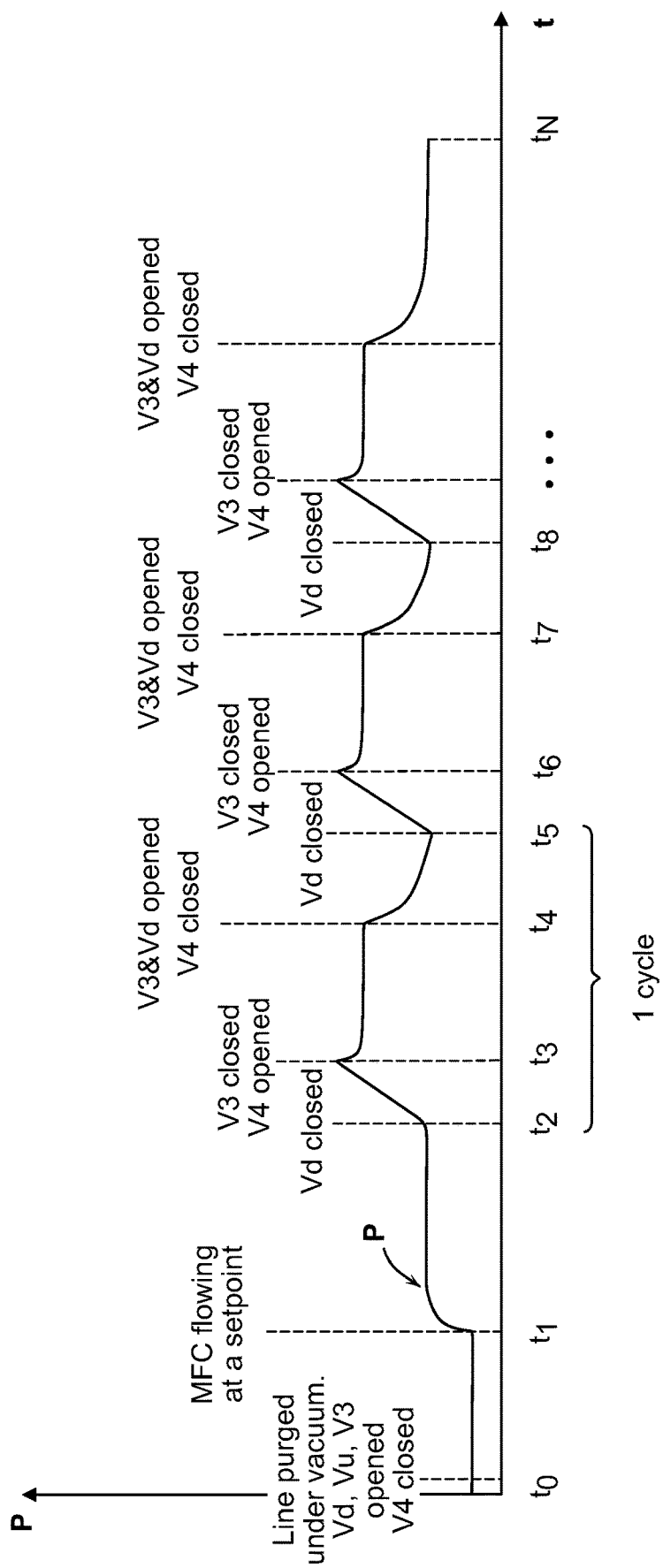
FIG. 7 is a graph of pressure versus time, illustrating operation of the MFV of FIG. 6.

The temperature T can be a temperature that is measured after the second timepoint (e.g., at time $t_4$ of FIG. 7). Optionally, the controller can be configured to determine or verify a flow rate based on at least two consecutive rate of rise iterations to obtain an averaged flow rate.

Example operation of the MFV 300 is shown in FIG. 7. An example sequence of a flow verification process is as follows: 1) at time $t_0$, the upstream valve Vu (e.g., valve 312 in FIG. 6), the downstream valve Vd (e.g., valve 316) and valve V3 (e.g., chamber valve 333) are opened, and valve V4 (e.g., bypass valve 334) is closed to pump down pressure in the MFV volume Vc (e.g., in chamber 310) and line pressure between the Test MFC and the MFV; 2) at time $t_1$, a flow setpoint is provided for the MFC to initiate flow; and, 3) by time $t_2$, the pressure in the MFV volume and the line pressure have stabilized, which indicates that the flow out of the test MFC is equal to the flow out of the critical flow nozzle (e.g., nozzle 330), and, at time $t_2$, the pressure is recorded ($P_2$) and the downstream valve Vd is closed. Optionally at time $t_2$, the temperature $T_2$ is also recorded, and the temperature and pressure can be continuously collected as pressure rises within the chamber.

The example sequence further includes: 4) at time $t_3$, pressure within the volume still satisfies a critical flow condition (i.e., $P_d/P_u < P_{critical}$), valve V3 is closed, and valve V4 is opened (e.g., simultaneously with closure of valve V3) such that flow out of the critical flow nozzle is diverted to a dump line; 5) by time $t_4$, pressure and temperature inside the MFV volume is stabilized, flow through the critical flow nozzle is still under a critical flow condition, pressure and temperature are recorded (i.e., P4 and T4, which can be used as T in Eqn. 2), valves Vd and V3 are opened, and valve V4 is closed to pump down pressure inside the MFV volume; and 6) optionally, steps 3-5 are repeated, as illustrated with respect to $t_5$-$t_7$, for a multiple-cycle flow verification.

In a further example operation of the MFV 300, the controller 350 can verify a flow rate by a dynamic flow verification calculation (e.g., by recursively solving Eqns. 1 and 3 or 4, as described above with respect to an HAMFV), which result can be compared to a previously-obtained two-point flow verification calculation. Such a comparison can be useful in verifying accuracy of a gas temperature estimation model or to improve the gas temperature estimation model for future runs. For example, based on such a comparison, gas property values or model coefficients can be updated, and, for future flow verification of a same gas, the MFV can operate similar to an HAMFV. In particular, V3 may be kept open and V4 closed during subsequent multiple-cycle flow varication periods, thereby significantly reducing the time required for future flow verification runs while providing for improved accuracy over existing HAMFV methods.

While illustrated as two distinct valves in the schematic diagram of FIG. 6, the chamber valve 333 and bypass valve 334 can optionally be implemented in a single valve device, such as a three-way valve device, that can divert fluid flow from the chamber to the dump location. While the schematic diagram of FIG. 6 includes only a single critical flow nozzle, more than one nozzle can be included, as illustrated in the MFV of FIG. 3, to provide for an expanded range of measurable flow rates. Example configurations of providing for multiple critical flow nozzles in an MFV are further described in U.S. Pat. No. 7,757,554, the entire teachings of which are incorporated herein by reference. Example configurations of MFVs including flow restrictors for external volume insensitivity are further described in U.S. Pat. Nos. 7,463,991 and 7,474,968, the entire teachings of which are incorporated herein by reference.

While example embodiments have been particularly shown and described, it will be understood by those skilled in the art that various changes in form and details may be made therein without departing from the scope of the embodiments encompassed by the appended claims.

The teachings of all patents, published applications and references cited herein are incorporated by reference in their entirety.

What is claimed is:

1. A mass flow verifier, comprising:
   a chamber configured to receive a fluid;
   a critical flow nozzle upstream of the chamber;
   a chamber valve configured to selectively enable fluid flow from the critical flow nozzle to the chamber;
   a downstream valve configured to selectively enable fluid flow from the chamber to a downstream location;
   a bypass valve configured to selectively enable fluid flow from the critical flow nozzle to a dump location; and
   a controller configured to verify flow rate of the fluid through the critical flow nozzle based on a rate of rise in pressure of the fluid as detected by a pressure sensor in the chamber by opening the downstream valve with opening of the chamber valve and closure of the bypass valve, holding the chamber valve open and closing the downstream valve to cause a rise in pressure in the chamber, thereafter closing the chamber valve and opening the bypass valve while holding the downstream valve closed to allow pressure in the chamber to stabilize, and calculating flow rate based on the stabilized pressure in the chamber.

2. The mass flow verifier of claim 1, wherein the controller is configured to verify flow rate based on a two-point flow verification calculation.

3. The mass flow verifier of claim 2, wherein the two-point flow verification calculation is according to the following:

$$Q = k \cdot \frac{V_c \cdot T_{stp}}{P_{stp} \cdot T} \cdot \left( \frac{P_4 - P_2}{t_3 - t_2} \right)$$

where Q is the flow rate, k is a constant, $V_c$ is a volume of the chamber, T is a temperature of the fluid in the chamber, $T_{stp}$ is standard temperature, $P_{stp}$ is standard pressure, $P_2$ is a pressure as detected at the first timepoint, $P_4$ is pressure as detected after the second timepoint, $t_2$ is time of the first timepoint, and $t_3$ is time of the second timepoint.

4. The mass flow verifier of claim 3, wherein the temperature T is a temperature as measured after the second timepoint.

5. The mass flow verifier of claim 1, wherein the critical flow nozzle is configured to maintain the fluid flowing through the critical flow nozzle at a critical flow.

6. The mass flow verifier of claim 1, wherein the controller is configured to verify flow rate based on at least two consecutive rate of rise iterations to obtain an averaged flow rate.

7. The mass flow verifier of claim 1, wherein the controller is further configured to verify a subsequent flow rate based on a dynamic flow verification calculation.

8. The mass flow verifier of claim 7, wherein the dynamic flow verification calculation is according to the following:

$$Q = k \cdot \frac{V_c \cdot T_{stp}}{P_{stp}} \cdot \frac{d}{dt}\left(\frac{P}{T}\right)$$

where Q is the flow rate, k is a constant, $V_c$ is a volume of the chamber, $T_{stp}$ is standard temperature, $P_{stp}$ is standard pressure, P is a detected pressure in the chamber, and T is a temperature of the fluid in the chamber.

9. The mass flow verifier of claim 8, wherein the controller is further configured to dynamically verify Q, estimate T, or a combination thereof based on flow rate determined from a prior two-point flow verification calculation.

10. A method of verifying a mass flow rate, comprising:
opening a downstream valve with opening of a chamber valve and closure of a bypass valve, the chamber valve configured to selectively enable fluid flow to a chamber from a critical flow nozzle upstream of the chamber, the bypass valve configured to selectively enable fluid flow from the critical flow nozzle to a dump location, and the downstream valve configured to selectively enable fluid flow from the chamber to a downstream location;
closing the downstream valve at a first timepoint to generate a rise in pressure in the chamber;
closing the chamber valve and opening the bypass valve, while holding the downstream valve closed, at a second timepoint to allow pressure within the chamber to stabilize and to divert fluid flow through the bypass valve to a dump location; and
verifying flow rate of the fluid based on a calculation of rate of rise in pressure of the fluid based on the stabilized pressure in the chamber as detected by a pressure sensor in the chamber.

11. The method of claim 10, wherein verifying flow rate is based on a two-point flow verification calculation.

12. The method of claim 11, wherein the two-point flow verification calculation is according to the following:

$$Q = k \cdot \frac{V_c \cdot T_{stp}}{P_{stp} \cdot T} \cdot \left(\frac{P_4 - P_2}{t_3 - t_2}\right)$$

where Q is the flow rate, k is a constant, $V_c$ is a volume of the chamber, T is a temperature in the chamber, $T_{stp}$ is standard temperature, $P_{stp}$ is standard pressure, $P_2$ is a pressure as detected at the first timepoint, $P_4$ is pressure as detected after the second timepoint, $t_2$ is time of the first timepoint, and $t_3$ is time of the second timepoint.

13. The method of claim 12, wherein the temperature T is a temperature as measured after the second timepoint.

14. The method of claim 10, further comprising maintaining the fluid flowing through the critical flow nozzle at a critical flow.

15. The method of claim 10, wherein verifying flow rate is based on at least two consecutive rate of rise iterations to obtain an averaged flow rate.

16. The method of claim 10, further comprising verifying a subsequent flow rate based on a dynamic flow verification calculation.

17. The method of claim 16, wherein the dynamic flow verification calculation is according to the following:

$$Q = k \cdot \frac{V_c \cdot T_{stp}}{P_{stp}} \cdot \frac{d}{dt}\left(\frac{P}{T}\right)$$

where Q is the flow rate, k is a constant, $V_c$ is a volume of the chamber, $T_{stp}$ is standard temperature, $P_{stp}$ is standard pressure, P is a detected pressure in the chamber, and T is a temperature of the fluid in the chamber.

18. The method of claim 17, further comprising dynamically verifying Q, estimating T, or a combination thereof based on flow rate determined from a prior two-point flow verification calculation.

19. The method of claim 10, further comprising opening the chamber valve and downstream valve and closing the bypass valve to permit line pressure between the chamber and a device under test to stabilize prior to closing the downstream valve at the first timepoint.

20. The method of claim 10, further comprising opening the chamber valve and downstream valve and closing the bypass valve to permit pressure inside the chamber to decrease subsequent to detection by the pressure sensor of a pressure for verifying flow rate of the fluid.

21. The method of claim 20, further comprising iteratively closing the downstream valve at a subsequent first timepoint and closing the chamber valve and opening the bypass valve at a subsequent second timepoint for a multiple-cycle flow verification.

22. A method of using the mass flow verifier of claim 1, comprising:
opening the chamber valve and downstream valve and closing the bypass valve to permit line pressure between the chamber and a device under test to stabilize;
detecting a first pressure of fluid in the chamber;
closing the downstream valve to generate a rate of rise in pressure in the chamber;
closing the chamber valve and opening the bypass valve to allow pressure within the chamber to stabilize and to divert fluid flow to a dump location;
detecting a second pressure of fluid in the chamber; and
determining a flow rate of the fluid based on the detected first and second pressures.

23. The method of claim 22, further comprising opening the chamber valve and downstream valve and closing the bypass valve to permit pressure inside the chamber to decrease subsequent to detection of the second pressure.

24. The method of claim 23, further comprising iteratively detecting a subsequent first pressure of fluid in the chamber, closing the downstream valve to generate a rate of rise in pressure in the chamber, closing the chamber valve and opening the bypass valve to allow pressure within the chamber to stabilize and divert fluid flow a dump location, and detecting a second pressure of fluid in the chamber for a multiple-cycle flow verification.

* * * * *